(12) United States Patent
Martin et al.

(10) Patent No.: US 7,788,683 B2
(45) Date of Patent: Aug. 31, 2010

(54) DATA STORAGE CARTRIDGE AND SYSTEM INCLUDING NON-TAPE STORAGE MEDIUM

(75) Inventors: Robert C. Martin, St. Paul, MN (US); Leo W. Spychalla, Cottage Grove, MN (US); John W. Gaylord, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 909 days.

(21) Appl. No.: 11/650,399

(22) Filed: Jan. 5, 2007

(65) Prior Publication Data

US 2008/0165665 A1 Jul. 10, 2008

(51) Int. Cl.
*G11B 7/24* (2006.01)
(52) U.S. Cl. ..................................... 720/718
(58) Field of Classification Search ............... 720/718, 720/723, 630, 720; 360/132, 97.01; 369/273
See application file for complete search history.

(56) References Cited

U.S. PATENT DOCUMENTS

| | | | |
|---|---|---|---|
| 2,939,603 A | 6/1960 | Young | |
| 5,822,162 A | 10/1998 | Tannert | |
| 6,490,242 B1 | 12/2002 | Bonn et al. | |
| 7,597,412 B2 * | 10/2009 | Chen et al. | 312/223.2 |
| 2004/0061014 A1 | 4/2004 | Hiraguchi | |
| 2004/0212926 A1 | 10/2004 | Volk et al. | |
| 2005/0117288 A1 | 6/2005 | Spychalla | |
| 2006/0072239 A1 | 4/2006 | Iftikar | |
| 2006/0256534 A1 * | 11/2006 | Garnett et al. | 361/730 |

FOREIGN PATENT DOCUMENTS

DE 1 169 694 5/1964

OTHER PUBLICATIONS

Acomdata™ Product Sheet titled "External Hard Drive Hi-Speed USB 2.0," 2004 AcomData, 2 sheets.

\* cited by examiner

*Primary Examiner*—Allen T Cao
(74) *Attorney, Agent, or Firm*—Shumaker & Sieffert, P.A.

(57) ABSTRACT

A data storage cartridge includes a housing, a non-tape storage medium contained within the housing, and a stacking feature provided on a top surface of the housing and on a bottom surface of the housing opposite the top surface. The stacking feature is asymmetrical about a first median axis oriented substantially perpendicular to the top surface and the bottom surface of the housing, and asymmetrical about a second median axis oriented substantially perpendicular to a first end of the housing and a second end of the housing opposite the first end. The stacking feature is configured to facilitate positioning of and maintaining a stacked configuration of the data storage cartridge with another data storage cartridge.

13 Claims, 8 Drawing Sheets

DATA STORAGE CARTRIDGE AND SYSTEM INCLUDING NON-TAPE STORAGE MEDIUM

FIELD OF INVENTION

The present invention relates generally to data storage devices.

BACKGROUND

Data storage cartridges have been used for decades in the computer, audio, and video fields as means for storing data files. Data storage cartridges utilizing magnetic storage tapes continue to be a popular form of recording large volumes of information for subsequent retrieval and use, particularly in an automated library setting. Although conventional, automated libraries using data storage tape cartridges provide access to vast amounts of information, data storage tape cartridges prevent true random access to files stored in the data storage tape cartridges. In particular, a conventional data storage tape cartridge consists of a magnetic storage tape (i.e., an elongated flexible medium having a magnetic recording layer) wound on one or more wheels or hubs.

Data is recorded to and retrieved from the magnetic storage tape by inserting the data storage tape cartridge within the tape drive and passing the storage tape in front of one or more read/write heads. The tape drives are usually streaming devices in which data is recorded in a serpentine fashion as the storage tape streams back and forth across the read/write heads. In particular, the tape drive typically writes the data along a number of tracks that span the length of the storage tape. For this reason, data storage tape cartridges can be viewed as sequentially storing data in a linear format. The linear data storage format, however, does not provide true random access to individual files. In particular, a tape drive must scan through the entire length of the storage tape until the appropriate file mark is identified on the storage tape. Unfortunately, this process increases the file retrieval time.

Due to the lack of true random access to individual files stored within data storage tape cartridges and the affinity for pre-existing automated, data storage tape cartridge library systems, data storage cartridges utilizing non-tape forms of data recording media have been developed as a data storage alternative. In particular, data storage tape cartridges using solid state storage medium have increased in availability and popularity. While data storage cartridges using solid state storage medium provide for true random access to data stored therein, the data storage cartridges typically rely on loading of the data storage cartridges into a corresponding docking device for reading from and/or writing to the solid state storage medium.

For these and other reasons, it would be desirable to facilitate loading of a non-tape data storage cartridge into a corresponding docking device and/or facilitate storage of the non-tape data storage cartridge when the non-tape data storage cartridge is removed from the docking device.

SUMMARY

One aspect of the present invention provides a data storage cartridge. The data storage cartridge includes a housing, a non-tape storage medium contained within the housing, and a stacking feature provided on a top surface of the housing and on a bottom surface of the housing opposite the top surface. The stacking feature is asymmetrical about a first median axis oriented substantially perpendicular to the top surface and the bottom surface of the housing, and asymmetrical about a second median axis oriented substantially perpendicular to a first end of the housing and a second end of the housing opposite the first end. The stacking feature is configured to facilitate positioning of and maintaining a stacked configuration of the data storage cartridge with another data storage cartridge.

Another aspect of the present invention provides a cartridge dock for interfacing with a data storage cartridge containing a non-tape storage medium. The cartridge dock includes a housing, a cartridge tray supported within the housing and configured to receive the data storage cartridge, an engagement mechanism positioned within the housing and configured to engage the data storage cartridge when the data storage cartridge is inserted into the cartridge tray, and a stacking feature provided on a top surface of the housing and configured to facilitate stacking of the data storage cartridge on the cartridge dock when the data storage cartridge is removed from the cartridge tray.

Another aspect of the present invention provides a data storage system. The data storage system includes a data storage cartridge containing a non-tape storage medium, a cartridge dock configured to receive the data storage cartridge and interface with the non-tape storage medium, means for aligning the data storage cartridge in the cartridge dock, means for engaging the data storage cartridge and loading the data storage cartridge in the cartridge dock, and means for positioning and maintaining a stacked configuration of the data storage cartridge with the cartridge dock when the data storage cartridge is removed from the cartridge dock.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., is used with reference to the orientation of the Figure(s) being described. Because components of embodiments described herein can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIGS. 1-6 illustrate one embodiment of a data storage cartridge 10. Data storage cartridge 10 includes a housing 20, a non-tape storage medium 30, an electrical connector 40, a stacking feature 50, a keying feature 60, and a retention feature 70. Stacking feature 50, keying feature 60, and retention feature 70 facilitate positioning of and maintaining a stacked configuration of data storage cartridge 10 with another data storage cartridge and/or a cartridge dock for data storage cartridge 10, facilitate aligning of data storage cartridge 10 in a cartridge dock for data storage cartridge 10, and facilitate loading of data storage cartridge 10 into a cartridge dock for data storage cartridge 10, respectively, as described below.

In one embodiment, housing 20 is general rectangular in shape and includes a top surface 21 representing a first major surface of data storage cartridge 10, a bottom surface 22 representing a second major surface of data storage cartridge 10 opposite top surface 21, opposite sides 23 and 24, and opposite ends 25 and 26.

Figures 4, 5:
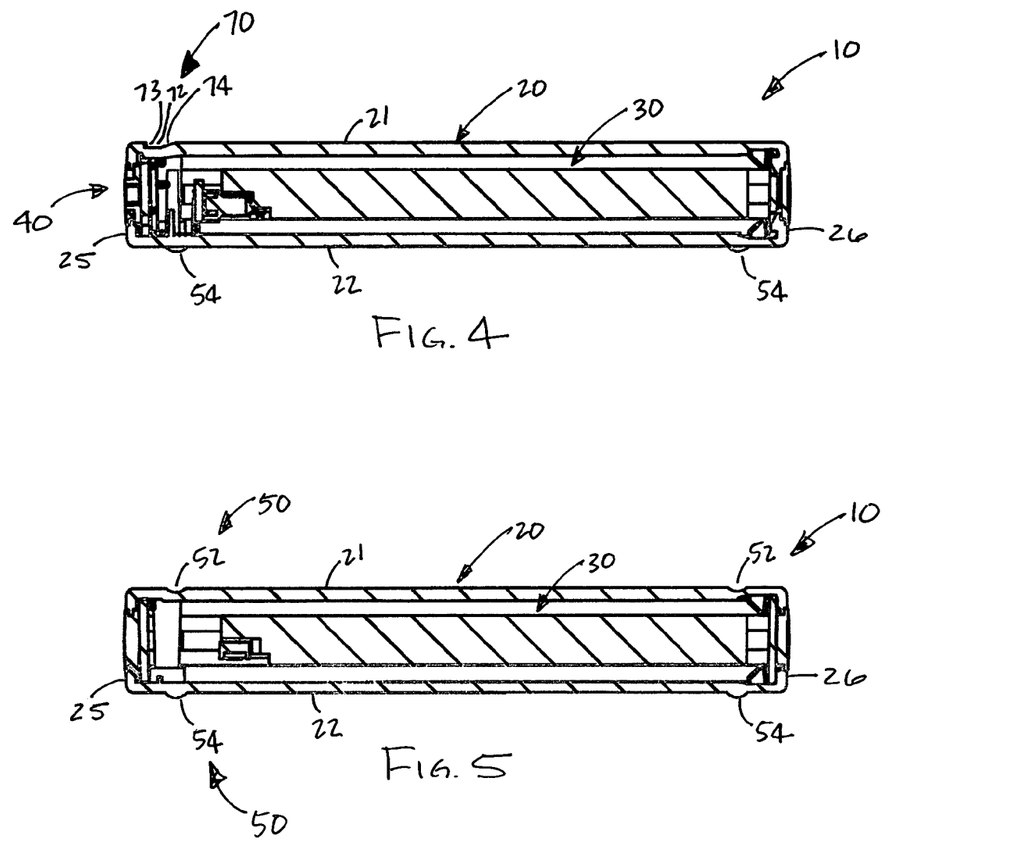
FIG. 4 is a cross-sectional view of the data storage cartridge of FIG. 1 from the perspective of line 4-4 of FIG. 2A.
FIG. 5 is a cross-sectional view of the data storage cartridge of FIG. 1 from the perspective of line 5-5 of FIG. 2A.

Non-tape storage medium 30 is positioned within and supported by housing 20. Non-tape storage medium 30 may take the form of or include one or more of a variety of storage medium such as a disk-shaped magnetic storage medium, a solid-state storage medium, an optical storage medium, a magneto-optical storage medium, and a holographic storage medium. The solid state storage medium may include a non-volatile memory such as an erasable programmable read-only memory (EPROM), an electrically erasable programmable memory (FLASH), or the like. In one embodiment, non-tape storage medium 30 is a random access storage medium.

Figure 1:
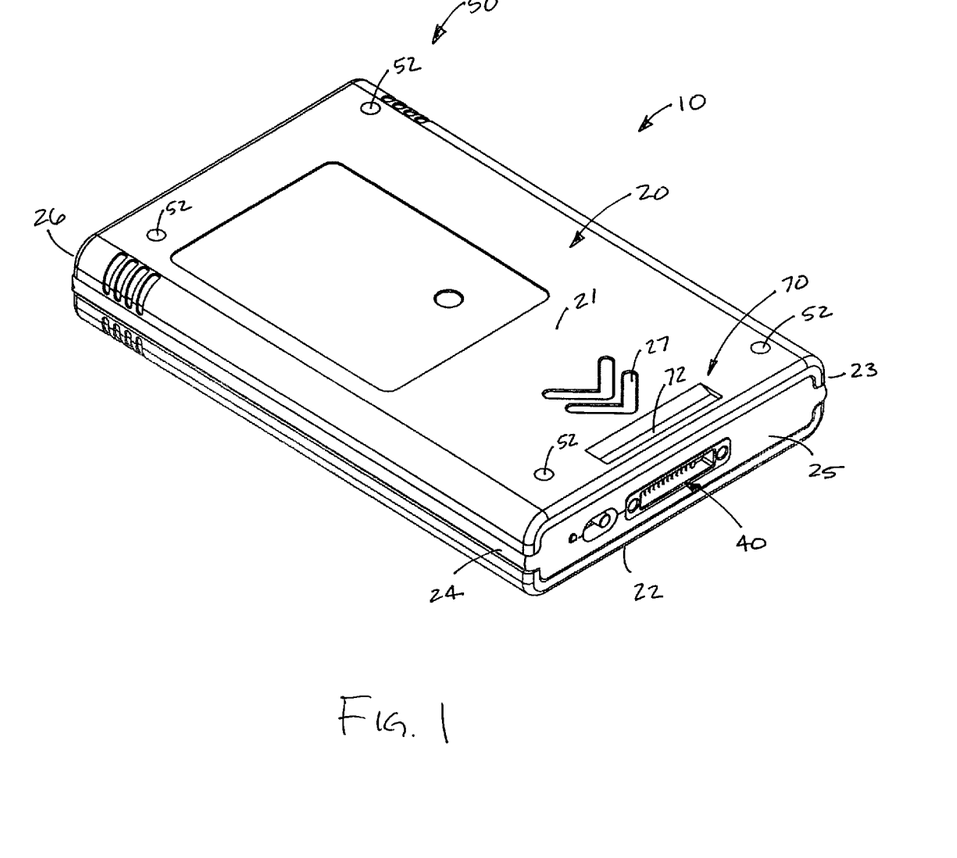
FIG. 1 is a perspective view illustrating one embodiment of a data storage cartridge.
Figure 6:
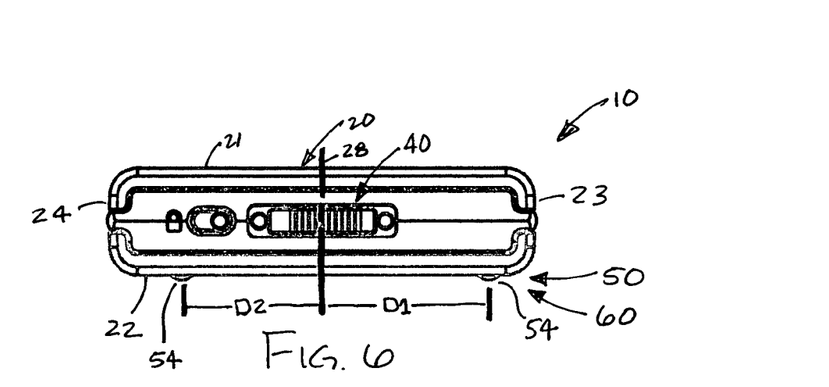
FIG. 6 is an end view of the data storage cartridge of FIG. 1.

Electrical connector 40 is supported by and communicated externally of housing 20. In one embodiment, electrical connector 40 is provided on end 25 of housing 20. Electrical connector 40 is operatively coupled to non-tape storage medium 30 and, as such, facilitates electrical connection with non-tape storage medium 30. Electrical connector 40 may include a pin-type connector, a pad-type connector, or other type of electrical connector.

Figure 7:
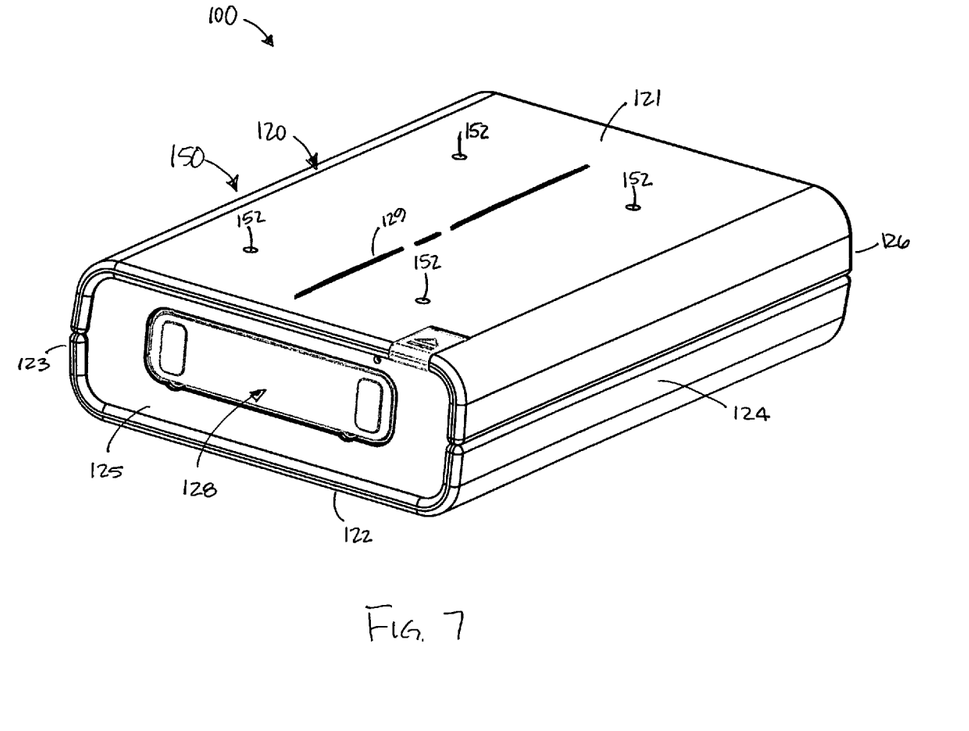
FIG. 7 is a perspective view illustrating one embodiment of a cartridge dock for a data storage cartridge.
Figure 8:
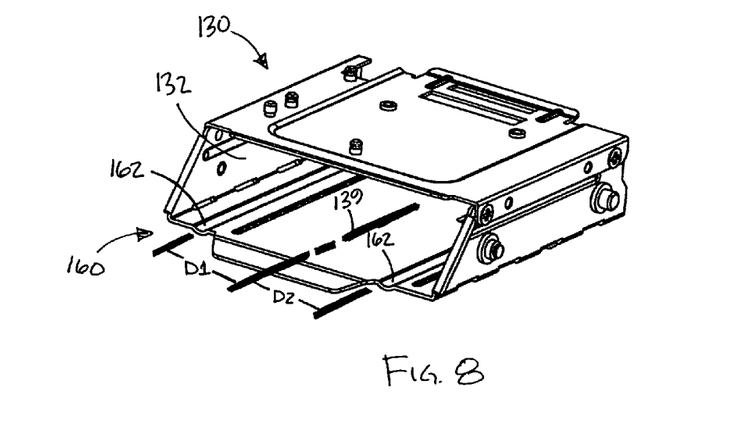
FIG. 8 is a perspective view illustrating one embodiment of a cartridge tray of a cartridge dock for a data storage cartridge.
Figure 9:
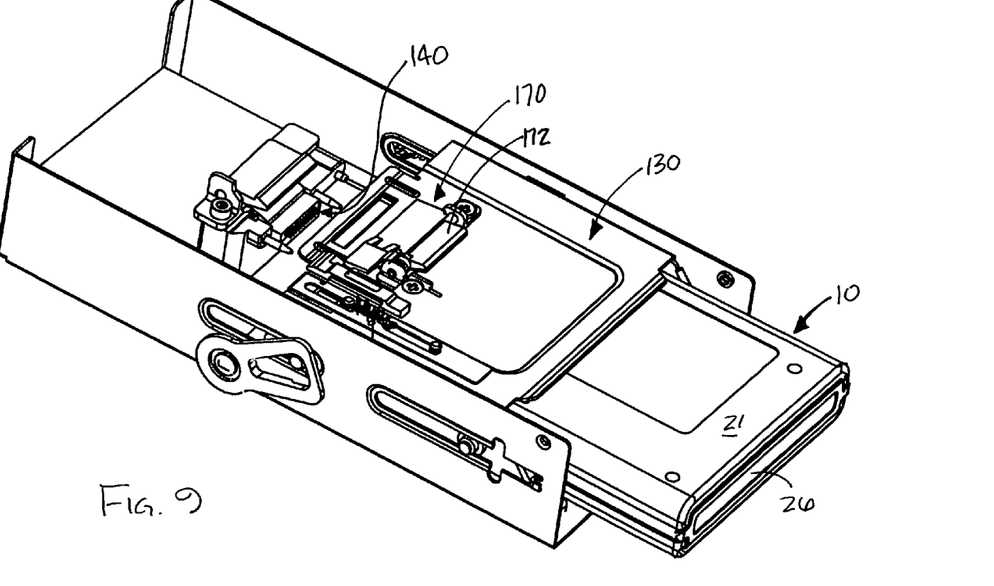
FIG. 9 is a perspective view illustrating one embodiment of a portion of a cartridge dock for a data storage cartridge.

FIGS. 7-9 illustrate one embodiment of a cartridge dock 100 for data storage cartridge 10. Cartridge dock 100 is adapted to receive data storage cartridge 10 and to read data from and/or write data to non-tape storage medium 30 of data storage cartridge 10.

In one embodiment, cartridge dock 100 includes a housing 120, a cartridge tray 130, an electrical connector 140, a stacking feature 150, a keying feature 160, and an engaging mechanism 170. Stacking feature 150, keying feature 160, and engagement mechanism 170 facilitate positioning of and maintaining a stacked configuration of data storage cartridge 10 with cartridge dock 100, facilitate aligning of data storage cartridge 10 in cartridge dock 100, and facilitate loading of data storage cartridge 10 in cartridge dock 100, respectively, as described below.

In one embodiment, housing 120 is generally rectangular in shape and includes a top surface 121 representing a first major surface of cartridge dock 100, a bottom surface 122 representing a second major surface of cartridge dock 100 opposite top surface 121, opposite sides 123 and 124, and opposite ends 125 and 126. In one embodiment, end 125 of housing 120 includes a cavity or socket 128 adapted to selectively receive data storage cartridge 10, as described below.

Cartridge tray 130 and electrical connector 140 of cartridge dock 100 are both positioned within and supported by housing 120. In one embodiment, cartridge tray 130 is generally rectangular in shape, and is sized and configured to receive and support data storage cartridge 10 when data storage cartridge 10 is inserted into cartridge dock 100, as described below.

Electrical connector 140 facilitates electrical connection with data storage cartridge 10 and, more specifically, facilitates electrical connection with electrical connector 40 of data storage cartridge 10 when data storage cartridge 10 is inserted into cartridge dock 100. As such, electrical connector 140 of cartridge dock 100 and electrical connector 40 of data storage cartridge 10 provide operative connection between cartridge dock 100 and data storage cartridge 10 and, more specifically, non-tape storage medium 30 of data storage cartridge 10 when data storage cartridge 10 is inserted into cartridge dock 100. Electrical connector 140 of cartridge dock 100 includes a pin-type connector, a pad-type connector, or other type of electrical connector corresponding to electrical connector 40 of data storage cartridge 10.

In one embodiment, stacking feature 50 of data storage cartridge 10 facilitates positioning of and maintaining a stacked configuration of data storage cartridge 10 with another data storage cartridge similar to data storage cartridge 10 and/or cartridge dock 100 for data storage cartridge 10, as described below. More specifically, stacking feature 50 enables one or more data storage cartridges 10 to be stacked on top of each other in a uniform, convenient, and stable manner.

In one embodiment, as illustrated, for example, in FIGS. 1-6, stacking feature 50 of data storage cartridge 10 includes recesses 52 provided in top surface 21 of housing 20, and projections 54 provided on bottom surface 22 of housing 20. In one embodiment, a position or spacing of recesses 52 as provided in top surface 21 corresponds to a position or spacing of projections 54 as provided on bottom surface 22. As such, projections 54 on bottom surface 22 of data storage cartridge 10 are configured to mate with recesses 52 provided in a top surface of another data storage cartridge similar to data storage cartridge 10, and recesses 52 in top surface 21 of data storage cartridge 10 are configured to receive projections 54 provided on a bottom surface of another data storage cartridge similar to data storage cartridge 10.

Figure 2A:
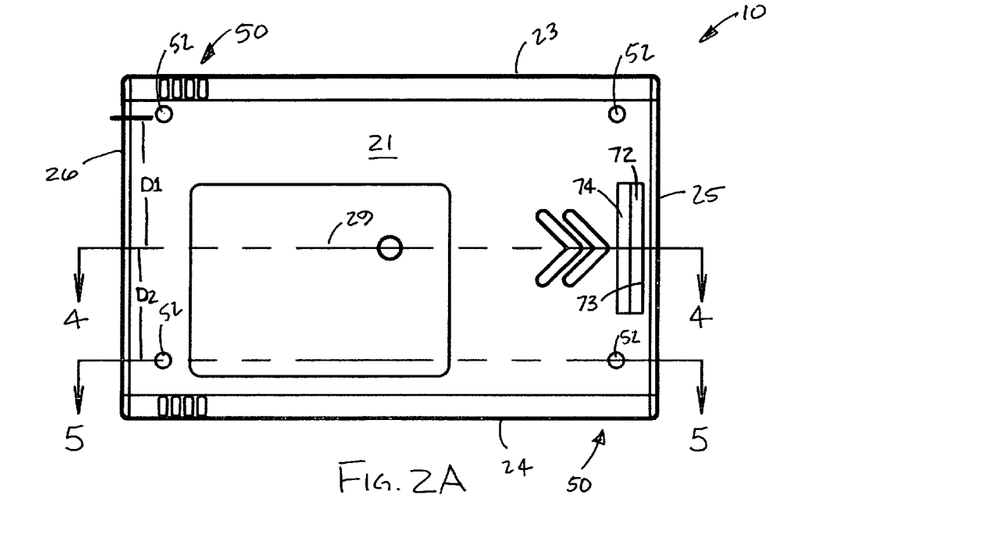
FIG. 2A is a top view of one embodiment of the data storage cartridge of FIG. 1.
Figure 3A:
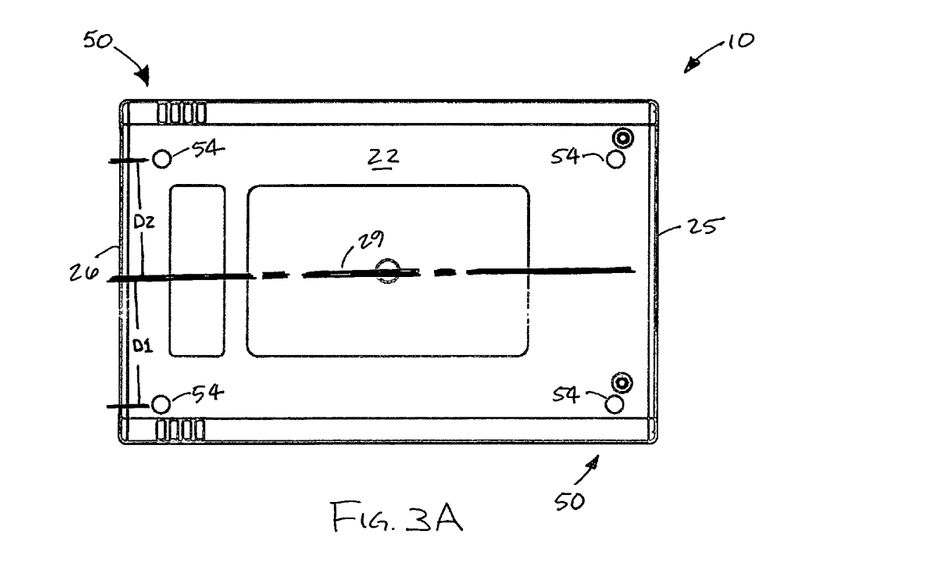
FIG. 3A is a bottom view of one embodiment of the data storage cartridge of FIG. 1.

In one exemplary embodiment, stacking feature 50 of data storage cartridge 10 includes four recesses provided in and located about a periphery of top surface 21 of housing 20, and four projections projected from and located about a periphery of bottom surface 22 of housing 20. As such, respective pairs of recesses 52 and projections 54 are aligned along respective axes oriented substantially parallel with a central or median axis 28 of housing 20 oriented substantially perpendicular to top surface 21 and bottom surface 22 of housing 20, and aligned along respective axes oriented substantially parallel with a central or median axis 29 of housing 20 oriented substantially perpendicular to ends 25 and 26 of housing 20.

In one embodiment, a shape of recesses 52 as provided in top surface 21 of housing 20 is complementary to a shape of projections 54 as provided on bottom surface 22 of housing 20. For example, in one exemplary embodiment, recesses 52 are hemispherical recesses and projections 54 are hemispherical projections. As such, projections 54 of data storage cartridge 10 nest in recesses 52 of another data storage cartridge similar to data storage cartridge 10 when data storage cartridge 10 is stacked on the other data storage cartridge, and projections 54 of another data storage cartridge similar to data storage cartridge 10 nest in recesses 52 of data storage cartridge 10 when the other data storage cartridge is stacked on data storage cartridge 10. Although recesses 52 and projections 54 are illustrated and described as being hemispherical in shape, it is within the scope of the present invention for recesses 52 and/or projections 54 to be of different shapes.

In one embodiment, stacking feature 50 of data storage cartridge 10 is orientation specific such that a single arrangement or configuration for stacking of data storage cartridge 10 with another data storage cartridge similar to data storage cartridge 10 is defined. In one embodiment, for example, stacking feature 50 is asymmetrical about central or median axis 28 oriented substantially perpendicular to top surface 21 and bottom surface 22 of housing 20, and is asymmetrical about central or median axis 29 oriented substantially perpendicular to ends 25 and 26 of housing 20. As such, in one exemplary embodiment, a distance D1 between axes 28 and 29 and a first set of recesses 52 and projections 54 is greater than a distance D2 between axes 28 and 29 and a second set of recesses 52 and projections 54. Thus, improper orientation of data storage cartridge 10 while stacking data storage cartridge 10 on another data storage cartridge similar to data storage cartridge 10 results in misalignment between data storage cartridge 10 and the other data storage cartridge and/or the inability to stack data storage cartridge 10 on the other data storage cartridge.

In one embodiment, as illustrated, for example, in FIGS. 2A and 3A, stacking feature 50 of data storage cartridge 10 although asymmetrical about central or median axes 28 and 29, is symmetrical about a central or median axis oriented substantially perpendicular to median axis 29. Accordingly, improper orientation of a data storage cartridge 10 including stacking feature 50 while stacking data storage cartridge 10 on another data storage cartridge including stacking feature 50 will result in misalignment between data storage cartridge 10 and the other data storage cartridge.

Figure 2B:
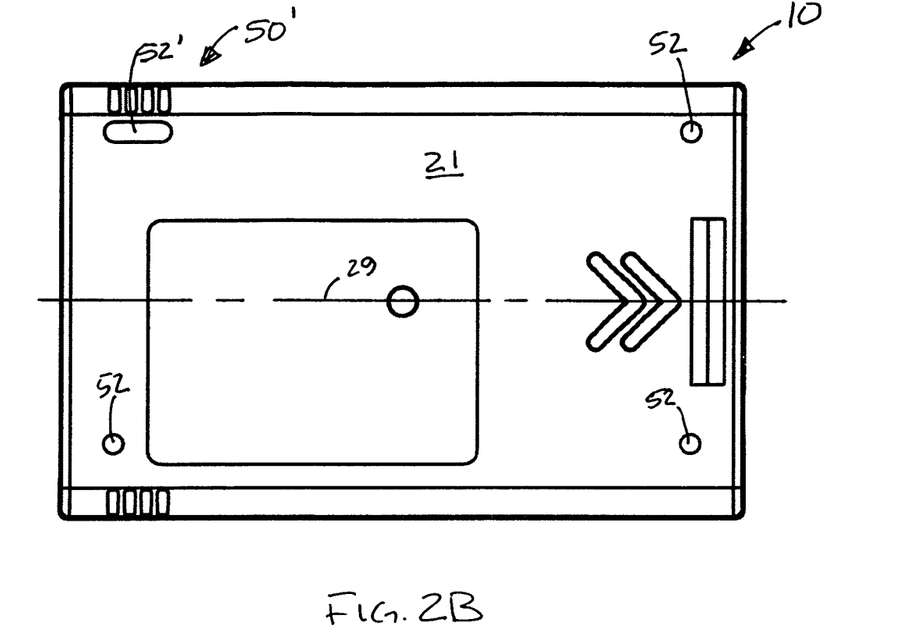
FIG. 2B is a top view of another embodiment of the data storage cartridge of FIG. 1.
Figure 3B:
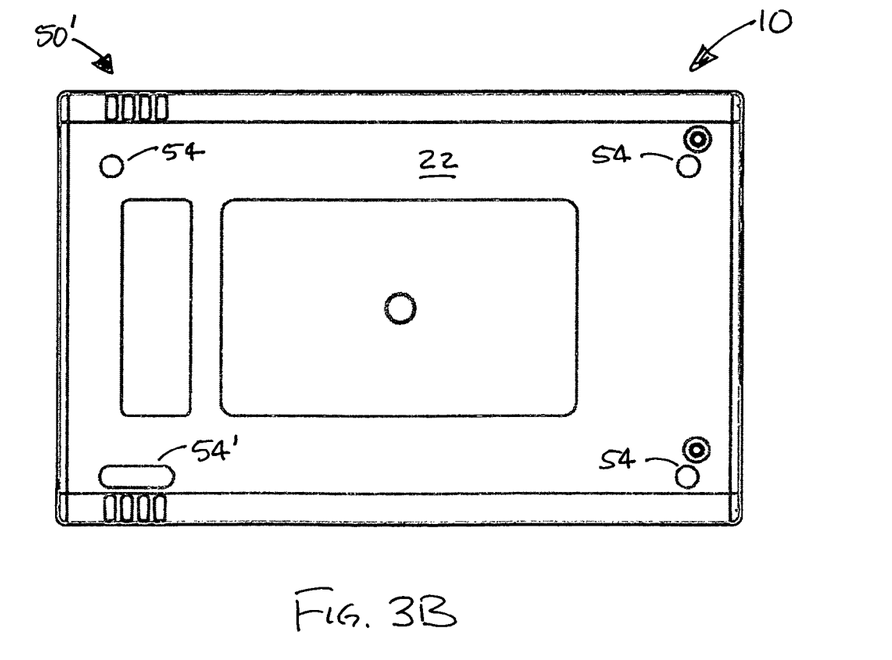
FIG. 3B is a bottom view of another embodiment of the data storage cartridge of FIG. 1.

In another embodiment, as illustrated, for example, in FIGS. 2B and 3B, stacking feature 50' of data storage cartridge 10 is similar to stacking feature 50, however, in addition to being location or position specific as described above, stacking feature 50' is also shape specific. More specifically, in one embodiment, at least one recess 52' as provided in top surface 21 of data storage cartridge 10 and a corresponding projection 54' as provided on bottom surface 22 of data storage cartridge 10 are of a shape different than that of the other recesses 52 and corresponding projections 54. For example, in one exemplary embodiment, recess 52' and corresponding projection 54' are of an oblong shape. Accordingly, improper orientation of a data storage cartridge 10 including stacking feature 50' while stacking data storage cartridge 10 on another data storage cartridge including stacking feature 50' will result in the inability to stack data storage cartridge 10 on the other data storage cartridge. It is understand that including features of different shape in stacking feature 50' encompasses including features of different size.

Figure 2C:
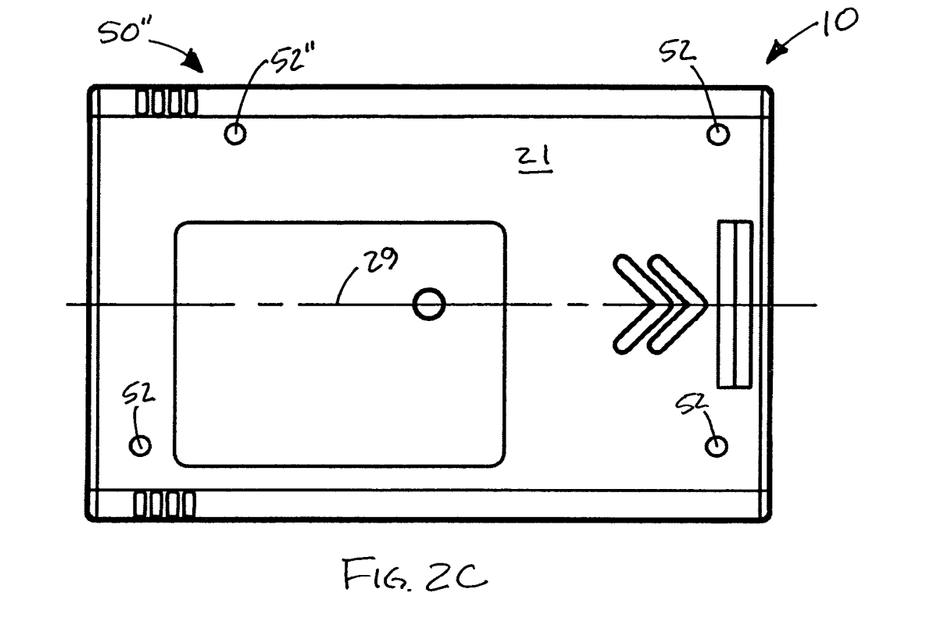
FIG. 2C is a top view of another embodiment of the data storage cartridge of FIG. 1.
Figure 3C:
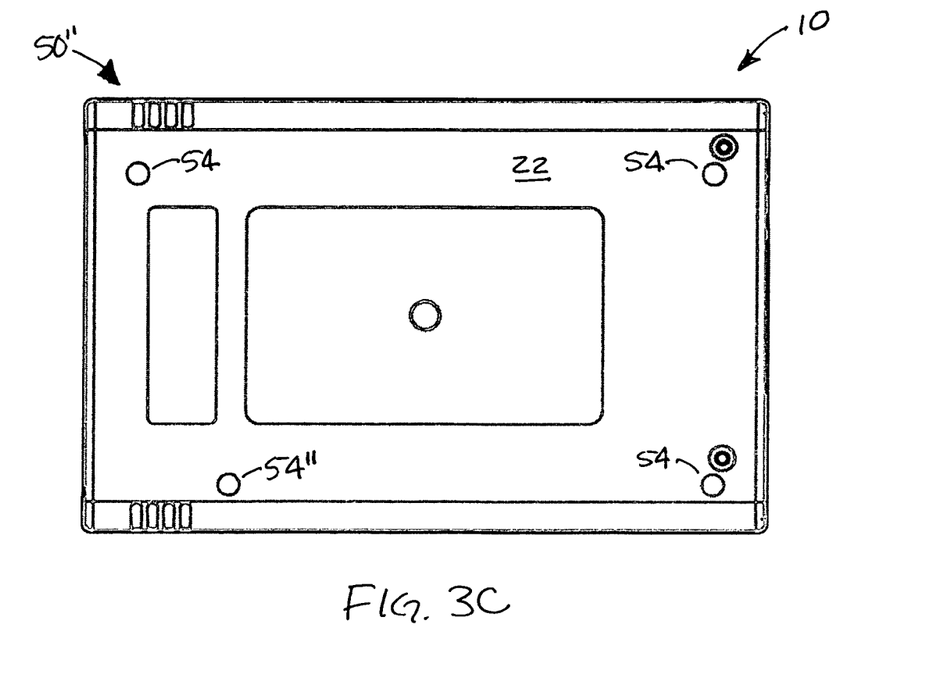
FIG. 3C is a bottom view of another embodiment of the data storage cartridge of FIG. 1.

In another embodiment, as illustrated, for example, in FIGS. 2C and 3C, stacking feature 50" of data storage cartridge 10 is similar to stacking feature 50, however, in addition to being asymmetrical about central or median axes 28 and 29, stacking feature 50" is also asymmetrical about a central or median axis oriented substantially perpendicular to median axis 29. More specifically, in one embodiment, one recess 52" as provided in top surface 21 of data storage cartridge 10 and one corresponding projection 54" as provided on bottom surface 22 of data storage cartridge 10 are offset or displaced in a direction parallel to median axis 29. Accordingly, improper orientation of a data storage cartridge 10 including stacking feature 50" while stacking data storage cartridge 10 on another data storage cartridge including stacking feature 50" will result in the inability to stack data storage cartridge 10 on the other data storage cartridge.

In one embodiment, stacking feature 50 (including stacking features 50' and 50") of data storage cartridge 10 and stacking feature 150 of cartridge dock 100 cooperate to facilitate positioning of and maintaining a stacked configuration of data storage cartridge 10 with cartridge dock 100. More specifically, stacking feature 50 of data storage cartridge 10 and stacking feature 150 of cartridge dock 100 enable one or more data storage cartridges 10 to be stacked on top of cartridge dock 100 in a uniform and stable manner.

In one embodiment, as illustrated, for example, in FIG. 7, stacking feature 150 of cartridge dock 100 includes recesses 152 provided in top surface 121 of housing 120. A position or spacing of recesses 152 of stacking feature 150 as provided in top surface 121 of housing 120 corresponds to a position or spacing of projections 54 of stacking feature 50 as provided on bottom surface 22 of data storage cartridge 10. As such, projections 54 on bottom surface 22 of data storage cartridge 10 are configured to mate with recesses 152 provided on top surface 121 of cartridge dock 100.

In one exemplary embodiment, similar to that described above with reference to data storage cartridge 10, stacking feature 150 of cartridge dock 100 includes four recesses provided in and located about a periphery of top surface 121 of housing 120. In addition, recesses 152 are aligned along respective axes oriented substantially parallel with a central or median axis 129 oriented substantially perpendicular to ends 125 and 126 of housing 120.

In one embodiment, similar to that described above with reference to data storage cartridge 10, a shape of recesses 152 of stacking feature 150 as provided in top surface 121 of cartridge dock 100 is complementary to a shape of projections 54 of stacking feature 50 of data storage cartridge 10 as provided on bottom surface 22 of data storage cartridge 10. For example, in one exemplary embodiment, where projections 54 of stacking feature 50 of data storage cartridge 10 are hemispherical projections, recesses 152 of stacking feature 150 of cartridge dock 100 are hemispherical recesses. As such, projections 54 of data storage cartridge 10 nest in recesses 152 of cartridge dock 100 when data storage cartridge 10 is stacked on cartridge dock 100. Although recesses 152 and projections 54 are illustrated and described as being hemispherical in shape, it is within the scope of the present invention for recesses 152 and/or projections 54 to be of different shapes.

In one embodiment, keying feature 60 of data storage cartridge 10 and keying feature 160 of cartridge dock 100 cooperate to facilitate aligning of data storage cartridge 10 in cartridge dock 100. More specifically, keying feature 60 of data storage cartridge 10 and keying feature 160 of cartridge dock 100 establish alignment of data storage cartridge 10 relative to cartridge tray 130 of cartridge dock 100 as data storage cartridge 10 is inserted into cartridge dock 100.

In one embodiment, as illustrated, for example, in FIG. 6, keying feature 60 of data storage cartridge 10 includes projections 54 of stacking feature 50 as provided on bottom surface 22 of housing 20. As such, projections 54 as provided on bottom surface 22 of data storage cartridge 10 perform a dual role of facilitating positioning of and maintaining a stacked configuration of data storage cartridge 10 with another data storage cartridge similar to data storage cartridge 10 and/or cartridge dock 100, and facilitating aligning of data storage cartridge 10 in cartridge tray 130 when data storage cartridge 10 is inserted in cartridge dock 100.

In one embodiment, as illustrated, for example, in FIG. 8, keying feature 160 of cartridge dock 100 includes grooves 162 formed in cartridge tray 130 of cartridge dock 100. Grooves 162 are sized and arranged to receive projections 54 as provided on bottom surface 22 of data storage cartridge 10. As such, in one exemplary embodiment, keying feature 160 of cartridge dock 100 includes a pair of spaced grooves 162 formed in cartridge tray 130. Accordingly, grooves 162 of cartridge tray 130 are spaced corresponding to a distance between projections 54 of stacking feature 50 of data storage cartridge 10. In one embodiment, grooves 162 communicate with an open end 132 of cartridge tray 130 and extend from open end 132 towards an opposite end of cartridge tray 130 substantially parallel with a central or median axis 139 of cartridge tray 130 extended through and oriented substantially perpendicular to open end 132.

In one embodiment, a shape of grooves 162 as formed in cartridge tray 130 is complementary to a shape of projections 54 as provided on bottom surface 22 of data storage cartridge 10. For example, in one exemplary embodiment where projections 54 of data storage cartridge 10 are hemispherical projections, grooves 162 of cartridge tray 130 have a semi-circular cross section. As such, projections 54 of data storage cartridge 10 slide in grooves 162 of cartridge tray 130 as data storage cartridge 10 is inserted into cartridge dock 100.

Although grooves 162 and projections 54 are illustrated and described as being semi-circular and hemispherical in shape, it is within the scope of the present invention for grooves 162 and/or projections 54 to be of different shapes. In addition, although illustrated and described as being formed on bottom surface 22 of data storage cartridge 10 and on a bottom surface of cartridge tray 130, keying feature 60 of data storage cartridge 10 and keying feature 160 of cartridge dock 100 may be formed on other surfaces of data storage cartridge 10 and cartridge tray 130.

In one embodiment, similar to that described above with reference to stacking feature 50 of data storage cartridge 10, keying feature 160 of cartridge dock 100 is orientation specific such that a single configuration for aligning and inserting of data storage cartridge 10 in cartridge dock 100 is defined. In one embodiment, for example, keying feature 160 of cartridge dock 100 is asymmetrical about central or median axis 139 extended through and oriented substantially perpendicular to open end 132 of cartridge tray 130. As such, in one exemplary embodiment, a distance D1 between axis 139 and a first groove 162 is greater than a distance D2 between axis 139 and a second groove 162. Thus, improper orientation of data storage cartridge 10 relative to cartridge dock 100 results in an inability to effectively insert data storage cartridge 10 into cartridge tray 130.

In one embodiment, retention feature 70 of data storage cartridge 10 and engagement mechanism 170 of cartridge dock 100 cooperate to facilitate loading of data storage cartridge 10 in cartridge dock 100. More specifically, retention feature 70 of data storage cartridge 10 and engagement mechanism 170 of cartridge dock 100 facilitate loading of data storage cartridge 10 within cartridge dock 100, moving of data storage cartridge 10 within cartridge dock 100, and securing of data storage cartridge 10 within cartridge dock 100 as data storage cartridge 10 is positioned within cartridge dock 100.

In one embodiment, as illustrated, for example, in FIGS. 1, 2, 4, and 9, retention feature 70 of data storage cartridge 10 includes a notch 72 provided in top surface 21 of housing 20, and engagement mechanism 170 of cartridge dock 100 includes a latch 172 positioned within cartridge dock 100. As such, latch 172 is configured to engage notch 72 when data storage cartridge 10 is inserted into cartridge dock 100 and, more specifically, when data storage cartridge 10 is inserted into cartridge tray 130 of cartridge dock 100. As such, notch 72 provides a means for cartridge dock 100 to positively engage data storage cartridge 10, to move data storage cartridge 10 into position with engagement with electrical connector 140 of cartridge dock 100, and to lock data storage cartridge 10 in a loaded position within cartridge dock 100 during operation.

In one embodiment, notch 72 as provided in top surface 21 of data storage cartridge 10 includes a surface 73 communicated with and oriented substantially perpendicular to top surface 21, and includes a surface 74 communicated with and oriented at an angle to top surface 21. As such, surface 74 defines a ramped surface of notch 72 extending into notch 72 from top surface 21 of housing 20.

In one embodiment, notch 72 is formed in top surface 21 of housing 20 adjacent to first end 25 of housing 20. As such, surface 73 of notch 72 defines a leading surface of notch 72 adjacent to first end 25. In one embodiment, as described below, first end 25 of data storage cartridge 10 with electrical connector 40 is inserted into cartridge dock 100 to establish operative connection of data storage cartridge 10 with cartridge dock 100. Thus, with surface 73 of notch 72 located adjacent to first end 25 of housing 20 and, therefore, electrical connector 40, possible effects of dimensional tolerances associated with manufacturing and assembly of data storage cartridge 10 may be reduced.

In one embodiment, as illustrated, for example, in FIG. 9, data storage cartridge 10 is selectively inserted into (and removed from) cartridge dock 100 to read data from and/or write data to non-tape storage medium 30 of data storage cartridge 10. More specifically, first end 25 of data storage cartridge 10 with electrical connector 40 is inserted through cavity or socket 128 (FIG. 7) of housing 120 of cartridge dock 100 and into cartridge tray 130 of cartridge dock 100 to establish electrical connection between electrical connector 40 of data storage cartridge 10 and electrical connector 140 of cartridge dock 100. As such, keying feature 60 of data storage cartridge 10 and keying feature 160 of cartridge dock 100 cooperate to facilitate aligning of data storage cartridge 10 in cartridge dock 100. In addition, retention feature 70 of data storage cartridge 10 and engagement mechanism 170 of cartridge dock 100 cooperate to facilitate loading of data storage cartridge 10 into cartridge dock 100. In one embodiment, indicia 27 is provided on surface 21 of data storage cartridge 10 to indicate a direction for insertion of data storage cartridge 10 into cartridge dock 100.

Figure 10:
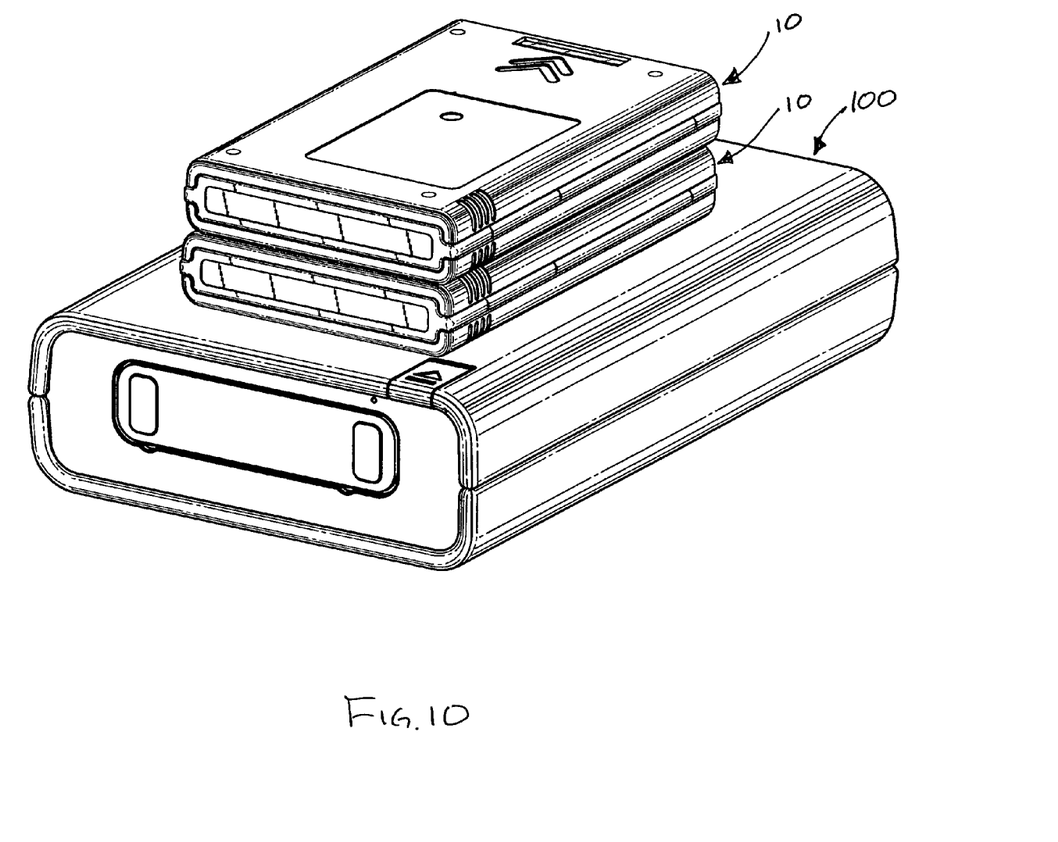
FIG. 10 is a perspective view illustrating one embodiment of a stacking configuration for data storage cartridges and a cartridge dock for the data storage cartridges.

In one embodiment, as illustrated in FIG. 10, one or more data storage cartridges 10 may be arranged in a stacked configuration on cartridge dock 100 and/or on another data storage cartridge 10 when data storage cartridges 10 are removed from cartridge dock 100. As such, stacking feature 50 of data storage cartridge 10 and stacking feature 150 of cartridge dock 100 cooperate to facilitate positioning of and maintaining the stacked configuration of data storage cartridge 10 with another data storage cartridge 10 and/or cartridge dock 100.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data storage cartridge, comprising:
    a housing;
    a non-tape storage medium contained within the housing; and
    a stacking feature provided on a top surface of the housing and a complementary stacking feature provided on a bottom surface of the housing opposite the top surface,
    wherein the stacking feature and the complementary stacking feature are asymmetrical about a first median axis oriented substantially perpendicular to the top surface and the bottom surface of the housing, and asymmetrical about a second median axis oriented substantially perpendicular to a first end of the housing and a second end of the housing opposite the first end, and
    wherein the stacking feature and the complementary stacking feature are configured to facilitate positioning of and maintaining of a stacked configuration of the data storage cartridge with another data storage cartridge that includes a corresponding stacking feature and a corresponding complement stare feature, such that the stacking feature of the data storage cartridge mates with the corresponding complementary stacking feature of the other data storage cartridge in the stacked configuration of the data storage cartridge with the other data storage cartridge.

2. The data storage cartridge of claim 1, wherein the stacking feature includes a plurality of recesses provided in the top surface of the housing and the complementary stacking feature includes a plurality of complementary projections provided on the bottom surface of the housing,
    wherein the projections on the bottom surface of the housing of the data storage cartridge are configured to nest in recesses provided in a top surface of another data storage cartridge, and wherein the recesses in the top surface of the housing of the data storage cartridge are configured to receive projections provided on a bottom surface of another data storage cartridge.

3. The data storage cartridge of claim 1, wherein the stacking feature is asymmetrical about an axis oriented substantially perpendicular to the second median axis.

4. The data storage cartridge of claim 1, wherein the stacking feature comprises features of at least one of different locations and different shapes.

5. The data storage cartridge of claim 1, further comprising:
    at least one keying feature provided on at least one surface of the housing,
    wherein the at least one keying feature is configured to facilitate aligning of the data storage cartridge in a cartridge dock for the data storage cartridge.

6. The data storage cartridge of claim 5, wherein the at least one keying feature is asymmetrical about the first median axis and asymmetrical about the second median axis.

7. The data storage cartridge of claim 5, wherein the at least one keying feature is formed by the complementary stacking feature provided on the bottom surface of the housing.

8. The data storage cartridge of claim 7, wherein the at least one keying feature includes at least two spaced projections provided on the bottom surface of the housing.

9. The data storage cartridge of claim 1, further comprising:
    a retention feature provided on the top surface of the housing,
    wherein the retention feature is configured to facilitate loading of the data storage cartridge in a cartridge dock for the data storage cartridge.

10. The data storage cartridge of claim 9, wherein the retention feature includes a notch provided in the top surface of the housing,
    wherein the notch includes a first surface communicated with and oriented substantially perpendicular to the top surface of the housing, and a second surface communicated with and oriented at an angle to the top surface of the housing.

11. The data storage cartridge of claim 9, further comprising:
    an electrical connector operatively coupled to the non-tape storage medium,
    wherein the electrical connector is supported by and communicated externally of the housing.

12. The data storage cartridge of claim 11, wherein the electrical connector is provided on the first end of the housing, and wherein the retention feature is provided on the top surface of the housing adjacent the first end of the housing.

13. The data storage cartridge of claim 1, wherein the non-tape storage medium comprises one of a solid-state storage medium, an optical storage medium, a magneto-optical storage medium, and a holographic storage medium.

* * * * *